(12) United States Patent
Mishra et al.

(10) Patent No.: US 7,127,707 B1
(45) Date of Patent: Oct. 24, 2006

(54) INTELLISENSE IN PROJECT UPGRADE

(75) Inventors: Debi Prasad Mishra, Redmond, WA (US); Devidas Joshi, Hyderabad (IN); Sadagopan Rajaram, Secunderabad (IN); Kishore M. N., Hyderabad (IN); Thomas Alex, Hyderabad (IN); P. Vasantha Rao, Hyderabad (IN); Gopinath C. H., Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 661 days.

(21) Appl. No.: 10/268,515

(22) Filed: Oct. 10, 2002

(51) Int. Cl.
  *G06F 9/45* (2006.01)
(52) U.S. Cl. .................. 717/137; 717/136; 717/140; 717/168; 717/169
(58) Field of Classification Search ........ 717/106–148, 717/136–171
  See application file for complete search history.

(56) References Cited

U.S. PATENT DOCUMENTS

| | | | |
|---|---|---|---|
| 5,339,428 A * | 8/1994 | Burmeister et al. ......... | 717/146 |
| 5,845,119 A | 12/1998 | Kozuka et al. | |
| 5,937,189 A | 8/1999 | Branson et al. | |
| 6,002,874 A | 12/1999 | Bahrs et al. | |
| 6,023,578 A | 2/2000 | Birsan et al. | |
| 6,066,181 A | 5/2000 | DeMaster | |
| 6,295,641 B1 * | 9/2001 | Beadle et al. ................ | 717/148 |
| 6,298,476 B1 | 10/2001 | Misheski et al. | |
| 6,446,133 B1 | 9/2002 | Tan et al. | |
| 6,453,356 B1 | 9/2002 | Sheard et al. | |
| 6,467,079 B1 | 10/2002 | Ettritch et al. | |
| 6,513,152 B1 | 1/2003 | Branson et al. | |
| 6,553,405 B1 | 4/2003 | Desrochers | |
| 6,611,817 B1 | 8/2003 | Dorrance et al. | |
| 6,622,165 B1 | 9/2003 | Phiyaw | |
| 6,718,364 B1 | 4/2004 | Connelly et al. | |
| 6,721,942 B1 | 4/2004 | Sievert | |
| 6,738,968 B1 | 5/2004 | Bosworth et al. | |
| 6,754,885 B1 * | 6/2004 | Dardinski et al. .......... | 717/113 |
| 6,754,886 B1 | 6/2004 | Merk et al. | |
| 6,760,913 B1 | 7/2004 | Bailey et al. | |
| 6,813,770 B1 | 11/2004 | Allavarpu et al. | |
| 2002/0073236 A1 | 6/2002 | Helgeson | |
| 2003/0172368 A1 * | 9/2003 | Alumbaugh et al. ........ | 717/106 |
| 2003/0192039 A1 * | 10/2003 | McConnell ................. | 717/171 |
| 2005/0183072 A1 * | 8/2005 | Horning et al. ............. | 717/140 |

OTHER PUBLICATIONS

Bjarne Stroustrup; "The C Programming Language Third Edition" Jul. 7, 1997 pp. 130-131 384-386 496-497 847 850-851.

(Continued)

*Primary Examiner*—Kakali Chaki
*Assistant Examiner*—Mark P. Francis
(74) *Attorney, Agent, or Firm*—Lee & Hayes, PLLC

(57) ABSTRACT

An exemplary upgrade module includes an upgrade wizard component, an upgrade analyzer component, and a source analyzer component wherein the upgrade wizard component operates in conjunction with an IDE to facilitate migration of source code or a project to the IDE or a runtime engine and/or OS associated with the IDE. An exemplary method includes selecting a source code or project written in a programming language associated with a native compiler that targets a native runtime engine, analyzing the code or project and then upgrading the code or project based on the analyzing such that the resulting upgraded code or project can compile on a foreign compiler and target a foreign runtime engine. According to such an exemplary method, the upgrade or migration optionally occurs without modifying the selected source code. Other exemplary methods, devices and/or systems are also disclosed.

33 Claims, 11 Drawing Sheets

OTHER PUBLICATIONS

Daniel Wu et al.; "StratOSphere: Mobile Processing of Distributed Objects in Java" ACM 1998 pp. 121-132.
Robert Stroud; "Transparency and Reflections in Distributed Systems" ACM Apr. 1992 pp. 99-103.
Richard Hayton et al.; "FlexiNet—A Flexible Component Oriented Middleware System" ACM Sep. 1998 pp. 17-24.
Tommy Thorn; "Programming Languages for Mobile Code" ACM Computing Surveys vol. 29 No. 3 Sep. 1997 pp. 213-239.
Alois Ferscha et al.; "JAVA Based Conservative Distributed Simulation" ACM Dec. 1997 pp. 381-388.
Wen Li et al.; "Collaboration Transparency in the DISCIPLE Framework" ACM Jan. 1999 pp. 326-335.
Begole et al.; "Flexible Collaboration Transparency: Supporting Worker Independence in Replicated Application—Sharing Systems" VPI ACM Jun. 1999 pp. 95-132.
U.S. Appl. No. 60/342,098, filed Dec. 23, 2002.

* cited by examiner

INTELLISENSE IN PROJECT UPGRADE

TECHNICAL FIELD

The subject matter disclosed herein relates generally to methods, devices and/or systems for migration or upgrade of software.

BACKGROUND

Application developers typically rely on an integrated development environment (IDE) to develop applications. At some point, however, due to advancements in IDE technology, a developer may choose to discontinue use of an old, familiar IDE and opt for a new, better IDE. Further, if a developer wishes to retain applications written using a source code associated with the old IDE, then the developer should ensure that the new IDE is compatible with the source code in which the old applications were written. Otherwise, the developer may have to recode the old applications using a source code associated with the new IDE. And, as most developers know, recoding can consume considerable time and resources.

To avoid recoding, most developers choose a new IDE that is merely a meager improvement over their trusted old IDE. As such, a developer may not be able to take advantage of a rich pool of resources and tools associated with other IDEs. Thus, a need exists for methods, devices and/or systems that facilitate 21 source code migration between IDEs, which, in turn, will allow developers more flexibility in choosing between IDEs. Various exemplary methods, devices and/or systems are presented below that address this need and/or other needs associated with upgrade or migration of projects, code, etc. between IDEs and/or associated resources.

SUMMARY

An exemplary upgrade module includes an upgrade wizard component, an upgrade analyzer component, and a source analyzer component wherein the upgrade wizard component operates in conjunction with an IDE to facilitate migration of source code or a project to the IDE or a runtime engine and/or OS associated with the IDE. An exemplary method includes selecting a source code or project written in a programming language associated with a native compiler that targets a native runtime engine, analyzing the code or project and then upgrading the code or project based on the analyzing such that the resulting upgraded code or project can compile on a foreign compiler and target a foreign runtime engine. According to such an exemplary method, the upgrade or migration optionally occurs without modifying the selected source code. Another exemplary method includes selecting a source code written in a programming language having an associated native compiler and an associated native runtime engine, setting a foreign compiler to operate in a special mode, and analyzing the source code using at least in part the foreign compiler set in the special mode. Other exemplary methods, devices and/or systems are also disclosed.

Additional features and advantages will be made apparent from the following detailed description of illustrative embodiments, which proceeds with reference to the accompanying figures.

BRIEF DESCRIPTION OF THE DRAWINGS

A more complete understanding of the various methods and arrangements described herein, and equivalents thereof, may be had by reference to the following detailed description when taken in conjunction with the accompanying drawings wherein.

DETAILED DESCRIPTION

Figure 1:
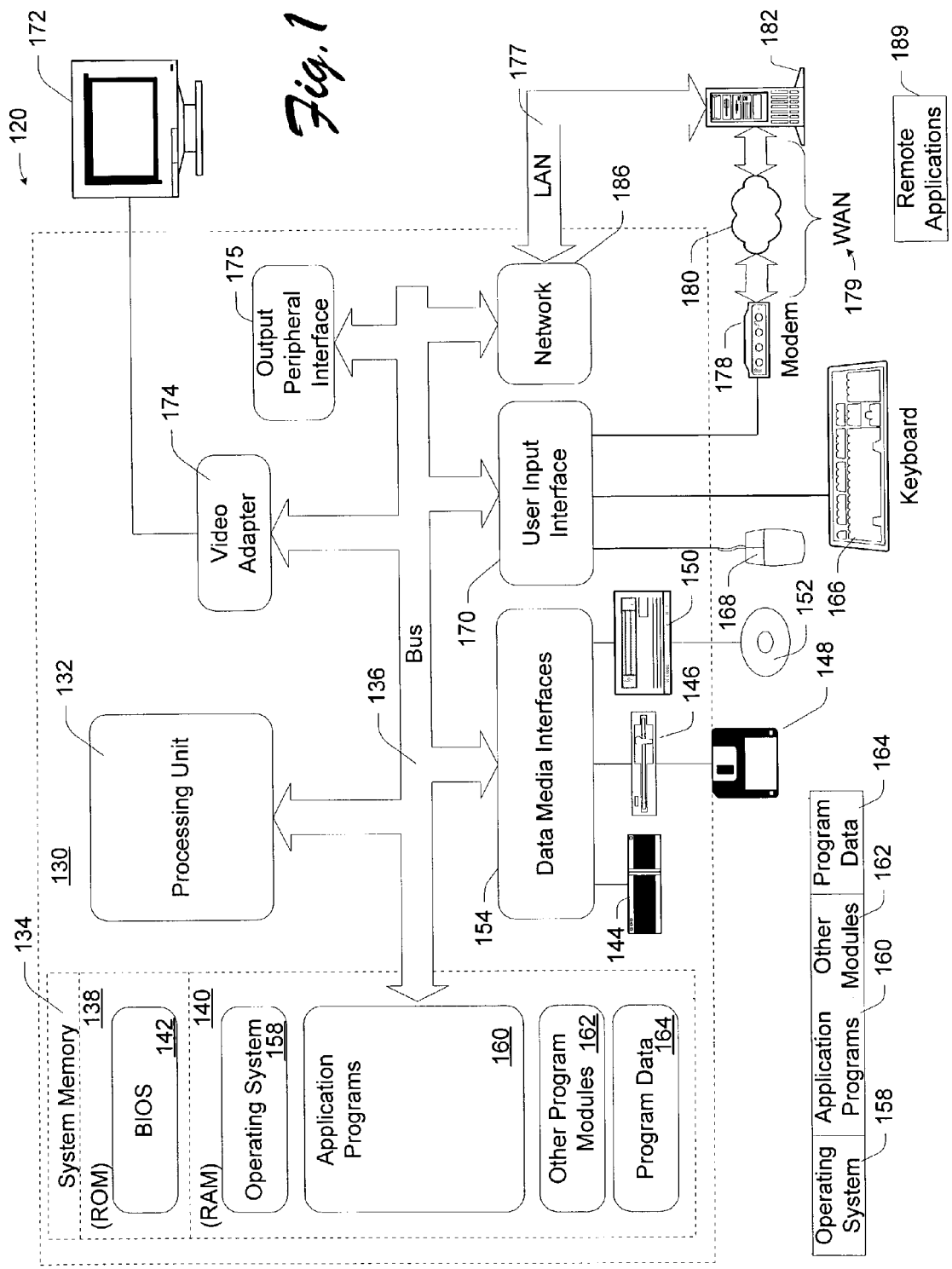
FIG. 1 is a block diagram generally illustrating an exemplary computer system on which various exemplary technologies disclosed herein may be implemented.

Turning to the drawings, wherein like reference numerals refer to like elements, various methods and converters are illustrated as being implemented in a suitable computing environment. Although not required, the methods and converters will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the methods and converters may be practiced with other computer system configurations, including hand-held devices, multi-processor systems, microprocessor based or programmable consumer electronics, network PCs, minicomputers, mainframe computers, and the like. The methods and converters may also be practiced in distributed computing environments where tasks are performed by remote processing devices that are linked through a communications network. In a distributed computing environment, program modules may be located in both local and remote memory storage devices.

Exemplary Computing Environment

FIG. 1 illustrates an example of a suitable computing environment 120 on which the subsequently described exemplary methods, IDEs, compilers, runtime engines, code, upgrade modules, etc., may be implemented.

Exemplary computing environment 120 is only one example of a suitable computing environment and is not intended to suggest any limitation as to the scope of use or functionality of the improved methods and arrangements described herein. Neither should computing environment 120 be interpreted as having any dependency or requirement relating to any one or combination of components illustrated in computing environment 120.

The improved methods and arrangements herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM, CD-R, CD-RW, DVD-ROM, DVD-RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and arrangements described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

IDEs, Projects and Code

Figure 2:
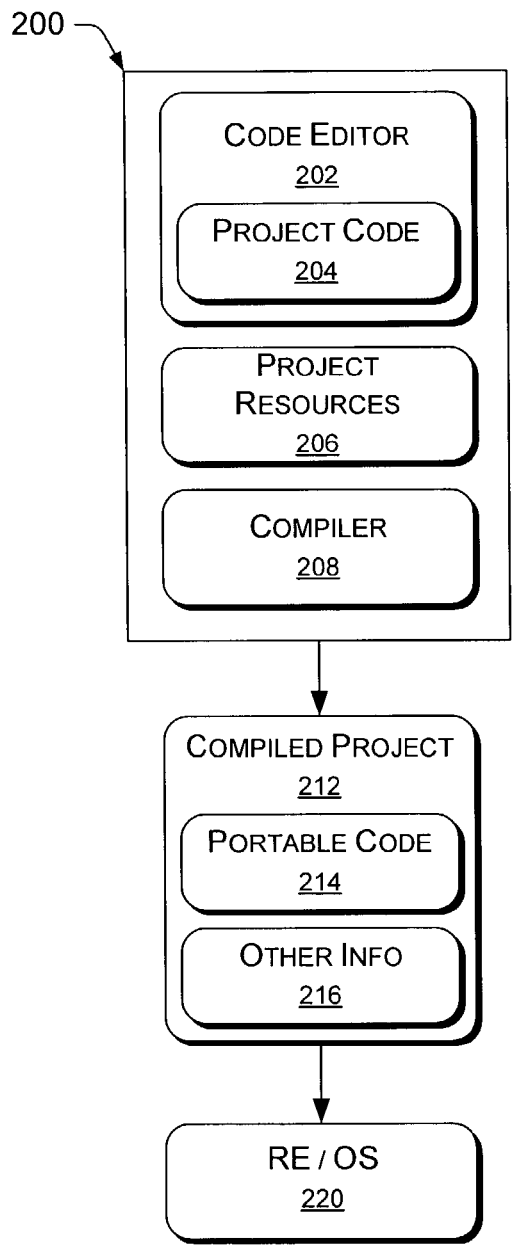
FIG. 2 is a block diagram illustrating an exemplary integrated development environment, a compiled project and a runtime engine and/or OS.

FIG. 2 shows an exemplary integrated development environment (IDE) 200 and a compiled project 212 targeted for execution on a runtime engine (RE) or an operating system (OS) 220. In object-oriented programming, the terms "Virtual Machine" (VM) and "Runtime Engine" (RE) have recently become associated with software that executes code on a processor or a hardware platform. In the description presented herein, the term "RE" includes VM. A RE is often associated with a larger system (e.g., IDE, framework, etc.) that allows a programmer to develop an application.

For a programmer, the application development process usually involves selecting an IDE, coding in an object-oriented programming language (OOPL) associated with that IDE to produce a source code, and compiling the source code using a compiler associated with the IDE. In FIG. 2, the IDE 200 includes a code editor 202 for writing or editing project source code 204, project resources 206 (e.g., libraries, utilities, etc.) and a compiler 208 for compiling the project source code 204. The programmer may elect to save project source code and/or project resources in a project file and/or a solution file, which may contain more than one project file. If a programmer elects to compile project code and/or project resources, then the resulting compiled code, and other information if required, is then typically made available to users, e.g., as a compiled project, a solution, an executable file, etc.

FIG. 2 shows a compiled project 210 generated by the IDE 200, which includes portable code 214 and optionally other information 216 (e.g., metadata, etc.) that may be necessary for proper execution of the portable code 214. The other information 216 may pertain to project resources 206 or other resources. A compiled project is typically available as one or more files capable of distribution over a network. For example, the .NET™ IDE can produce a compiled project as a portable executable file containing intermediate language code (IL code) and metadata, which is suitable for distribution over the Internet and execution using the .NET™ RE. Of course, one or more separate code files and one or more separate data files may be contained within a project file or a compiled project file. Upon receipt of the requisite file or files, a user can execute an embedded application or applications on a RE or an OS associated with the selected IDE. FIG. 2 shows the RE or OS 220 associated with the IDE 200.

Traditional IDEs or frameworks, such as the JAVA™ language framework (Sun Microsystems, Inc., Palo Alto, Calif.), were developed initially for use with a single OOPL (i.e., monolithic at the programming language level); however, a recently developed framework, .NET™ framework (Microsoft Corporation, Redmond, Wash.), allows programmers to code in a variety of OOPLs (e.g., VISUAL BASIC®, C++, C#, JScript, etc.). This multi-OOPL or multi-source code framework is centered on a single compiled intermediate language having a virtual object system (VOS). As a result, the object hierarchy and the nature of the compiled code differ between the JAVA™ language framework and the .NET™ framework.

While the aforementioned .NET™ framework exhibits programming language or source code interoperability, a need exists for methods, devices and/or systems that allow for project, solution, source code, portable code, etc., migration from one IDE to another IDE, for example, wherein source code developed using one IDE can be compiled to execute successfully on a RE associated with another IDE. Of course, as described herein, exemplary methods, devices, and/or systems may help to upgrade or migrate anywhere from a portion of an application's or project's source code to all of an application's or package's source code.

Figure 3:
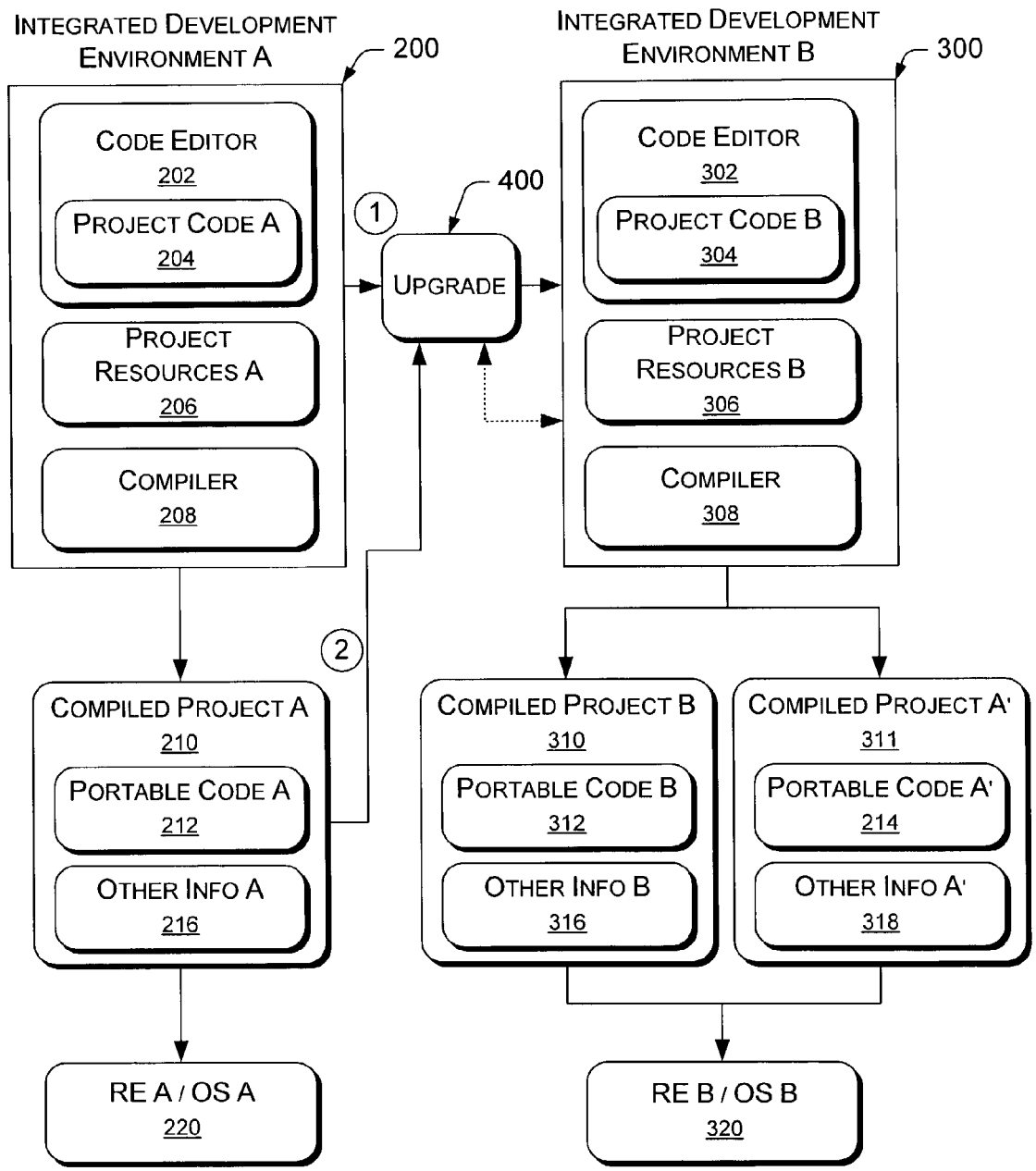
FIG. 3 is a block diagram illustrating two exemplary integrated development environments, associated compiled projects and runtime engines and/or OSs along with an exemplary upgrade module.

FIG. 3 shows IDE A 200, IDE B 300 and an upgrade module 400 capable of migrating (1) an uncompiled project A or components of project A (e.g., project source code A 204 and project resources A 206) and/or (2) a compiled project A 210 or components of compiled project A (e.g., portable code A 212 and other information 216) to IDE B 300 and/or to compatibility with RE B or OS B 320. In other words, the upgrade module 400 aids in project or code migration to a foreign IDE and/or foreign RE or OS.

The upgrade module 400, which is optionally part of an IDE (e.g., part of IDE B 300), facilitates migration and production of a compiled migrated project. Where the upgrade module 400 is separate from the IDE B 300, then, the upgrade module 400 optionally communicates with one or more components of IDE B 300 (e.g., the compiler 308, etc.). As shown in FIG. 3, compiled project A' 311 represents a migrated compiled project that includes portable code A' 214 and other information A' 318 whereas compiled project B 310 represents a native compiled project that includes portable code B 312 and other information B 316. Various exemplary methods, devices and/or systems disclosed herein help to ensure that compiled project A' 311 executes on RE B or OS B 320 in a suitable manner, for example, in a manner comparable to execution of compiled project A 210 on RE A or OS A 220.

Figure 4:
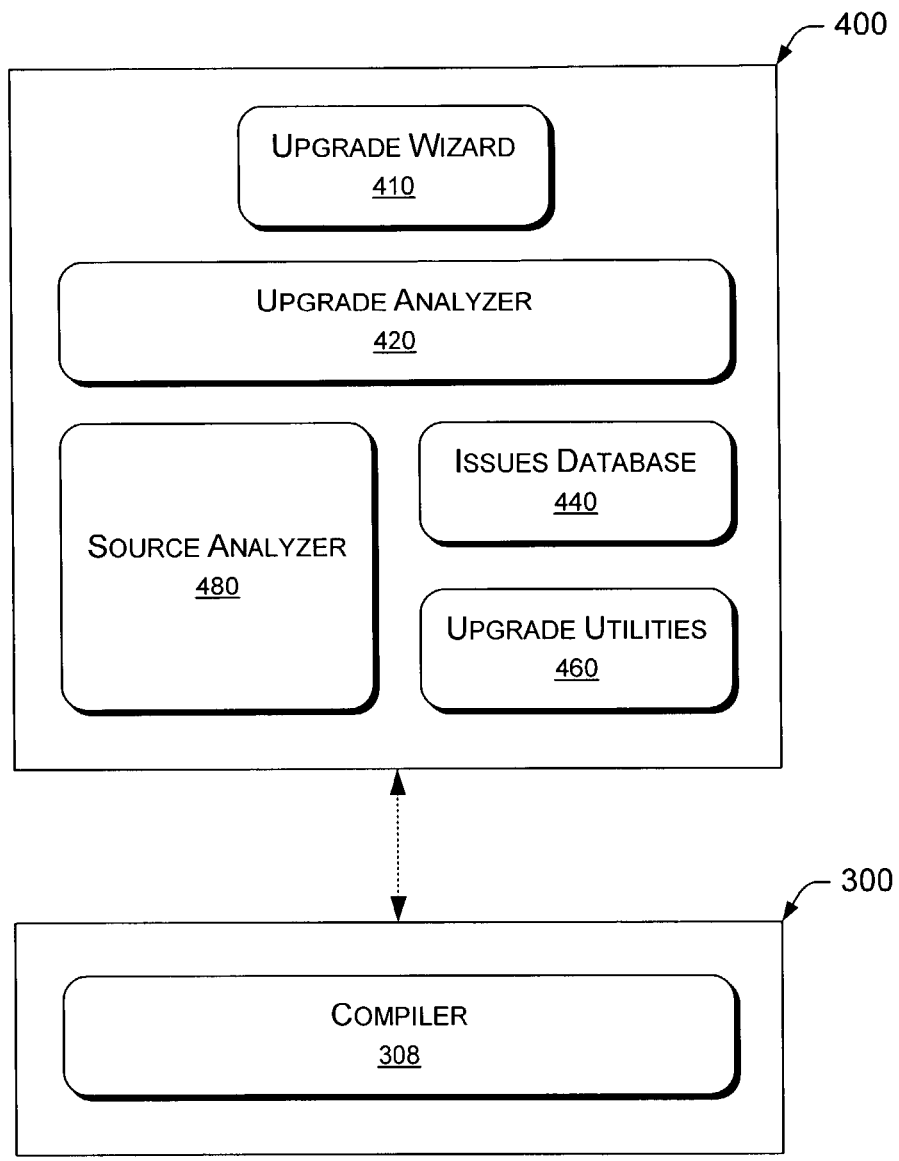
FIG. 4 is a block diagram of an exemplary upgrade module wherein a compiler optionally serves as a source analyzer.

FIG. 4 shows an exemplary upgrade module 400 together with a compiler 308 associated with an IDE. The upgrade module 400 includes an upgrade wizard 410, an upgrade analyzer 420, upgrade issues 440, upgrade utilities 460 and optionally a source analyzer 480. As described below, the source analyzer 480 identifies information and communicates the information to the upgrade analyzer 420, alternatively, the compiler 308 may identify information and communicate the information to the upgrade analyzer 420. The upgrade issues 440 include, but are not limited to, possible upgrade or migration incompatibilities, which may include known incompatibilities, incompatibilities having a high certainty of occurring and incompatibilities having little certainty and/or no chance of occurring. Upgrade issues may relate to compilation, execution and/or other aspects of a code or project (e.g., types, classes, etc.). In addition, certainty of occurrence for any particular issue may ultimately depend on any of a variety of factors pertaining to, for example, compilation, execution, and use.

Figure 5:
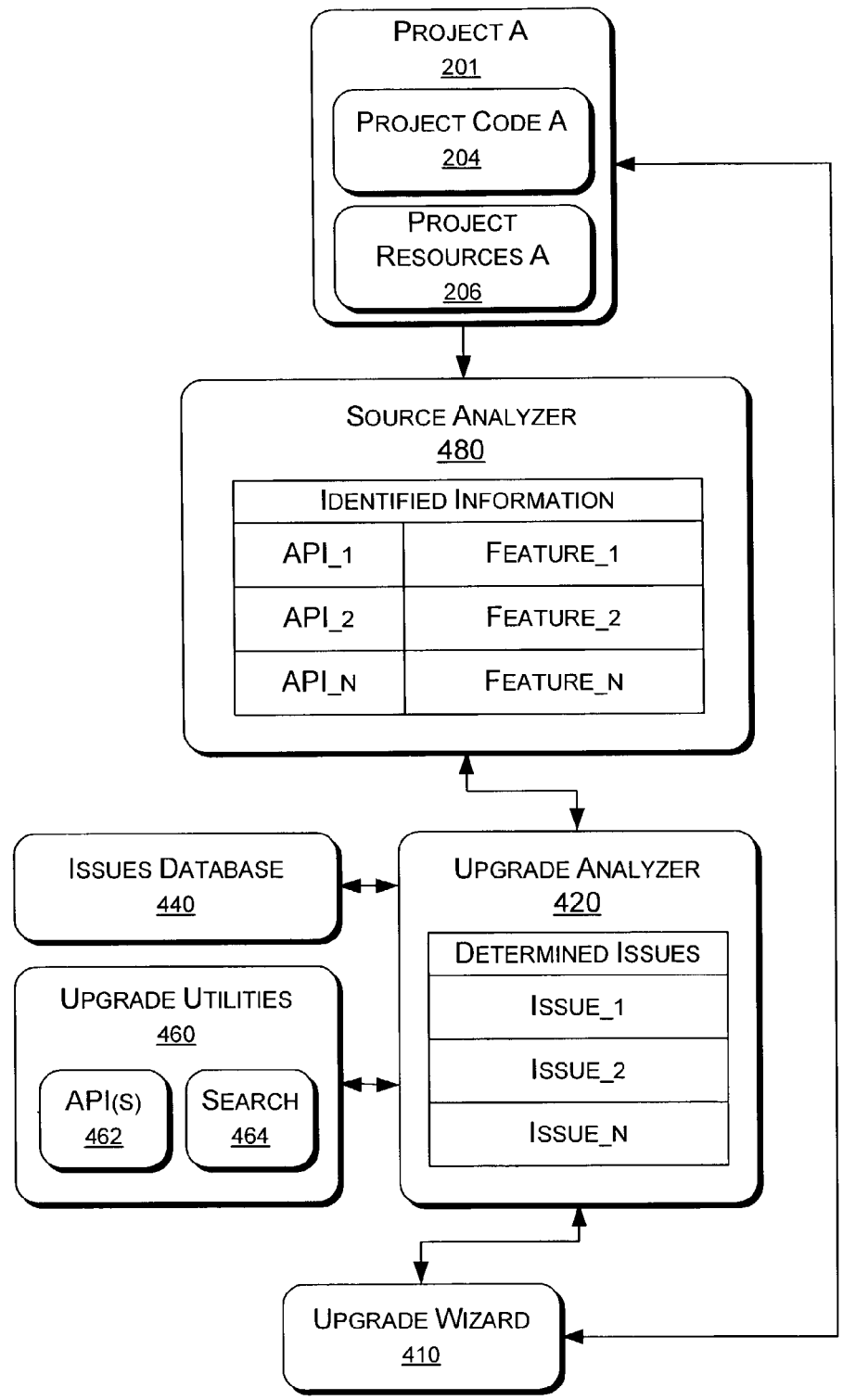
FIG. 5 is a block diagram of an exemplary upgrade or migration process.

FIG. 5 shows an exemplary migration method and/or system 500. An upgrade wizard 410 interacts with project A 201, which includes project code A 204 and project resources A 206. For example, a foreign IDE (e.g., IDE B 300 of FIG. 3) may attempt to open project A 201, recognize that project A is not associated with IDE B 300, and initiate the upgrade wizard 410. The upgrade wizard 410 then interacts with project A 201, for example, to detect number and/or type of files. The upgrade wizard 410 then communicates with the upgrade analyzer 420 and/or the source analyzer 480 to commence analysis of appropriate project code 204, resources 206, etc. The source analyzer 480 identifies various information such as, but not limited to, APIs (e.g., API_1, API_2, API_n) and features (e.g., Feature_1, Feature_2, Feature_n). This information is communicated to the upgrade analyzer 420 which uses the identified information to determine possible upgrade issues (e.g., Issue_1, Issue_2, Issue_n) germane to compilation, execution, etc., of project A 201 using capabilities associated with the foreign IDE.

To identify information, the source analyzer 480 analyzes project A source code 204 and/or project A resources 206. While FIG. 4 shows the source analyzer 480 as part of the upgrade module 400, an alternative exemplary upgrade module uses a separate compiler as a source analyzer. For example, a compiler may act as a source analyzer by providing suitable information or by operating in a special mode that recognizes certain failures as part of an upgrade process. In special mode operation, a compiler may also identify API calls that are affected by the planned migration.

Where the upgrade module relies on the .NET™ IDE or framework, an attributing mechanism may mark such APIs and the compiler may operate in a special mode that allows for detection of the APIs during a source analysis. In both of these exemplary scenarios, identified information is available for communication to the upgrade analyzer 420.

In performing an analysis, the upgrade analyzer 420 may use a database containing issues 440 and/or other information. For example, the upgrade analyzer 420 may use a piece of identified information to tag or determine one or more issues 440 contained in a database (e.g., an issue database). Upgrade utilities 460 may include one or more APIs 462 and/or search capabilities 464. The upgrade analyzer 420 may use one or more of the APIs 462 to translate the identified information to more useful information which may help to determine one or more issues. For instances where an upgrade analyzer communicates with a compiler and the compiler acts as a source analyzer, such APIs help to more fully utilize compiler identified information. Use of one or more APIs is especially beneficial where a compiler provides limited information and/or information in a format not readily suited for issue determination.

In instances where a source analyzer or a compiler identifies information pertaining to missing classes, external classes, unsupported classes, classes with known incompatibilities, and/or class references (e.g., to classes in a class path), an exemplary API may try to determine locations of the classes or alternative classes and/or possibly recommend a prescription that helps facilitate migration. As already mentioned, the upgrade utilities 460 may include search capabilities 464. Where a source analyzer or a compiler identifies information pertaining to type libraries (e.g., for one or more COM interfaces used in a project or code), then a heuristic registry search mechanism may help detect the type libraries and thereby facilitate migration. Upgrade utilities 460 may further aid in determining issues related to Windows Foundation Classes (WFC), dynamic-link libraries (dlls), etc.

Figure 6:
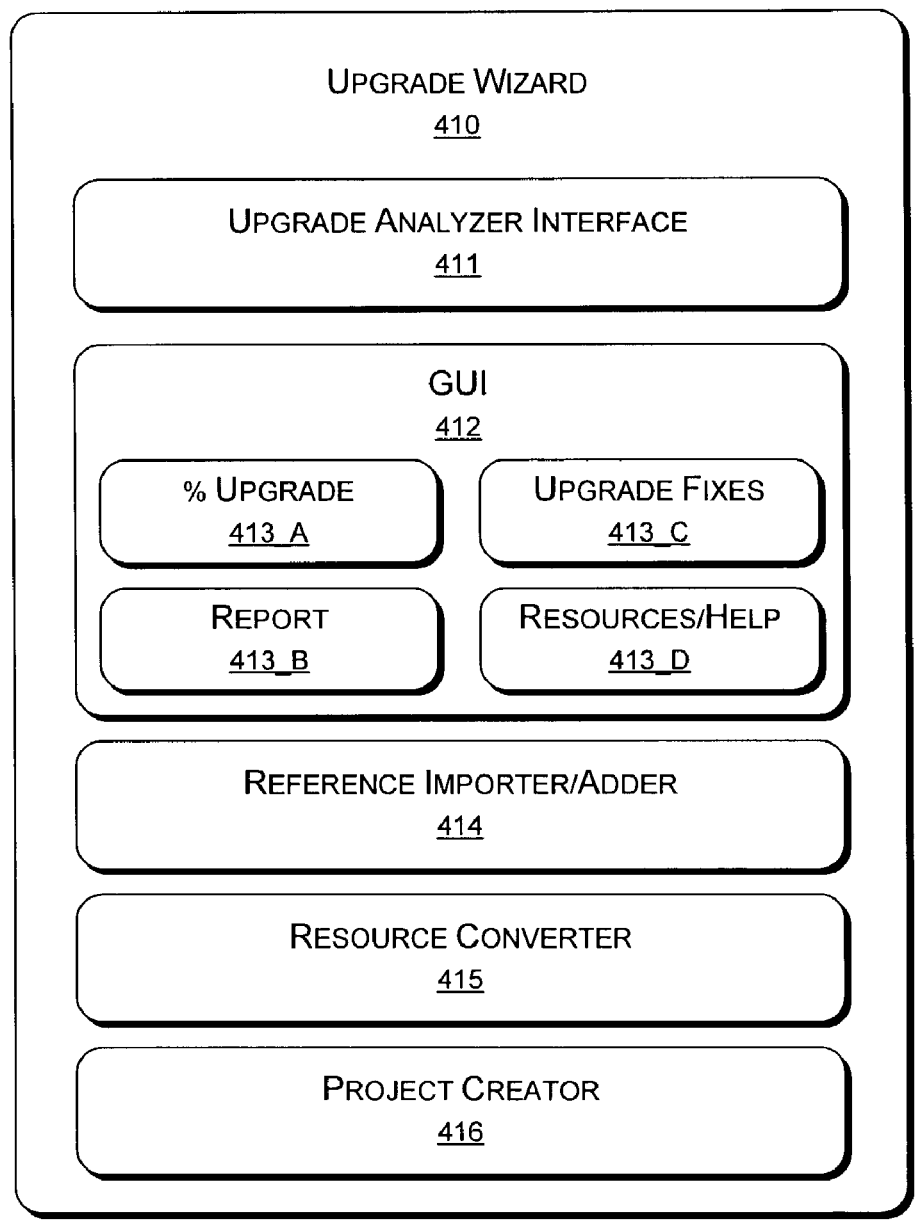
FIG. 6 is a block diagram of an exemplary upgrade wizard.

FIG. 6 shows an exemplary upgrade wizard 410. The upgrade wizard 410 facilitates migration of a project, source code (e.g., a portion or entire), etc., to a foreign IDE or for subsequent execution on a foreign RE or OS. The upgrade wizard 410 communicates with an upgrade analyzer via an upgrade analyzer interface 411. The upgrade wizard 410 operates automatically, semi-automatically and/or manually, for example, with user input. Regardless of operational mode, the upgrade wizard 410 may provide a user interface to enhance the user experience and/or facilitate migration. The upgrade wizard 410 includes a graphical user interface (GUI) module 412. The GUI module 412 includes various submodules, such as, but not limited to, a percent upgrade module 413_a, an upgrade issue report module 413_b, an upgrade fixes module 413_c, and a resources or help module 413_d. The percent upgrade module 413_a may provide a bar or other graphical indicator to show upgrade progress. In some instances, an upgrade module may not be able to migrate one-hundred percent of a project, source code, etc. Thus, the percent upgrade module 413_a may indicate a final percentage less than one-hundred percent. For example, a bar may change color from green to red at 95% to signify that only 95% of the project, source code, etc., can be migrated automatically. In this example, other upgrade wizard features may facilitate migration of the remaining 5% of the project, source code, etc., where it is desirable to retain functionality contained in the remaining 5%.

The issue report module 413_b allows for display, printing, or other output of an issue report. An issue report may include all issues or select issues pertaining to migration and/or functionality of a migrated project, source code, etc. For example, if a user wishes to retain only certain functionality, then the upgrade wizard 410 may allow the user to select for reporting of issues related to the certain functionality. An issue report may also include hyperlinks, wherein selection of a hyperlink associated with an issue (or group of issues, etc.) links the user to other resources or help locally or remotely (e.g., via a network).

The upgrade fixes module 413_c may displays upgrade fixes for a variety of issues related to migration. For example, if the upgrade analyzer determines that an external class is not available (e.g., an external class unavailable issue), then the upgrade fixes module 413_c may display fix information that helps to rectify the availability problem. Fix information may include alternative classes, potential locations of external classes, and/or code segments that may help retain desired functionality. The upgrade fixes module 413_c may operate automatically, semi-automatically and/or manually to make fixes. For example, the module 413_c may display a list of fixes and then implement the fixes automatically, upon selection by a user, or in a step-by-step manner that allows a user to discern how any particular fix is implemented. In addition, a one-to-one or other correspondence may exist between fixes and issues.

The resources and/or help module 413_d operates locally and/or remotely to provide a user with resources and/or help pertaining to migration. For example, the resources and/or help module 413_d may link to a targeted IDE. In this example, a user may via the upgrade wizard 410, use IDE resources and/or help to facilitate migration. IDE resources may include an IDE code editor for writing and/or editing code. In a coordinated fashion, an issue report may include a hyperlink to source code wherein selection of the hyperlink causes a resources/help module to initiate an IDE code editor having the source code ready to edit. Yet further, the resources/help module may display edit information to facilitate migration of the displayed source code. Alternatively, the resources/help module may cause the code editor to automatically display such edit information.

The exemplary upgrade wizard 410 also includes a reference importer and/or adder module 414. The reference importer and/or adder module 414 may operate to add references to required libraries. For example, if COM servers are used, then the reference importer and/or adder module 414 may import type libraries to managed assemblies and add these references. Also consider instances wherein WFC libraries are required, wherein the reference importer and/or adder module 414 may add references to such libraries.

The exemplary upgrade wizard 410 also includes a resource converter module 415. The resource converter module 415 may, for example, convert resource files to a new format (e.g., .NET™ format) and then add the converted files or content thereof to an upgraded project, source code, etc. The upgrade wizard 410 may also include a project creator module 416 that allows a user to create a new project.

Figure 7:
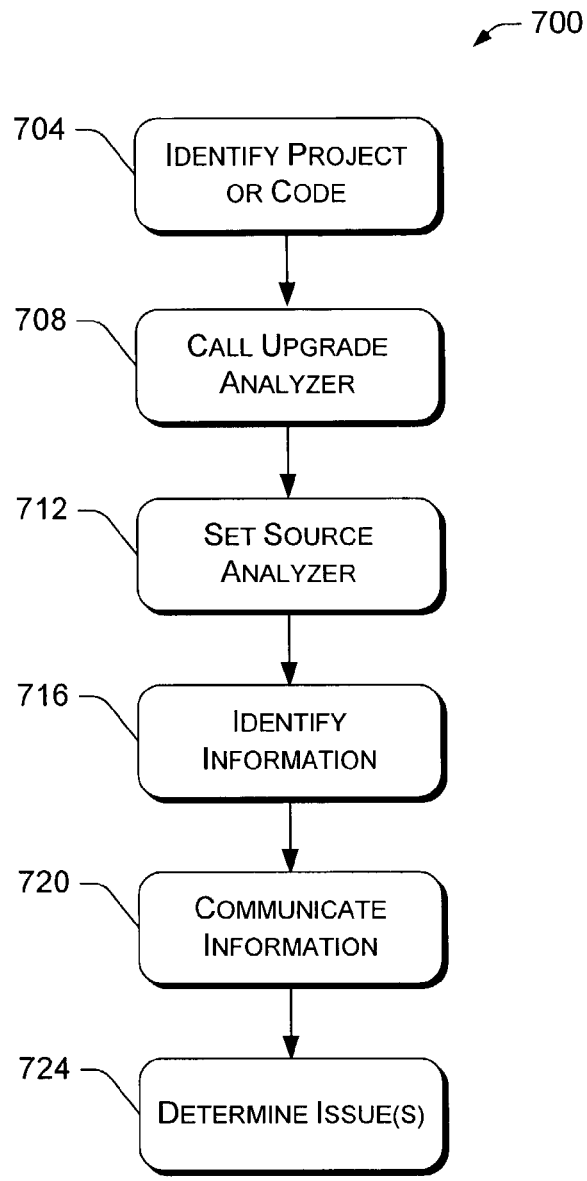
FIG. 7 is a block diagram of an exemplary method for determining issues related to upgrade or migration.

FIG. 7 shows an exemplary method 700 for determining upgrade issues. In an identification block 704, a user identifies a project, code, etc., for migration. Typically, a user will identify the project, code, etc., using a foreign IDE. A call block 708 follows wherein, for example, a foreign IDE makes a call to an upgrade analyzer that can facilitate migration of the project, code, etc., to the foreign IDE 11 and/or for execution on an associated foreign RE or OS. In a set block 712, an upgrade analyzer may set source analyzer operational parameters and/or compiler operational parameters. For example, as discussed above, a compiler may operate in a special mode and the set block 712 may set compiler operational parameters that instruct the compiler to operate in such a special mode.

Once set, in an identification block 716, the source analyzer and/or compiler identifies pertinent information. A communication block 720 involves communication of the identified information to, for example, an upgrade analyzer. Finally, in a determination block 724, one or more issues germane to upgrade or migration are determined, for example, using an upgrade analyzer having an issue database (e.g., a table, etc.).

Figure 8:
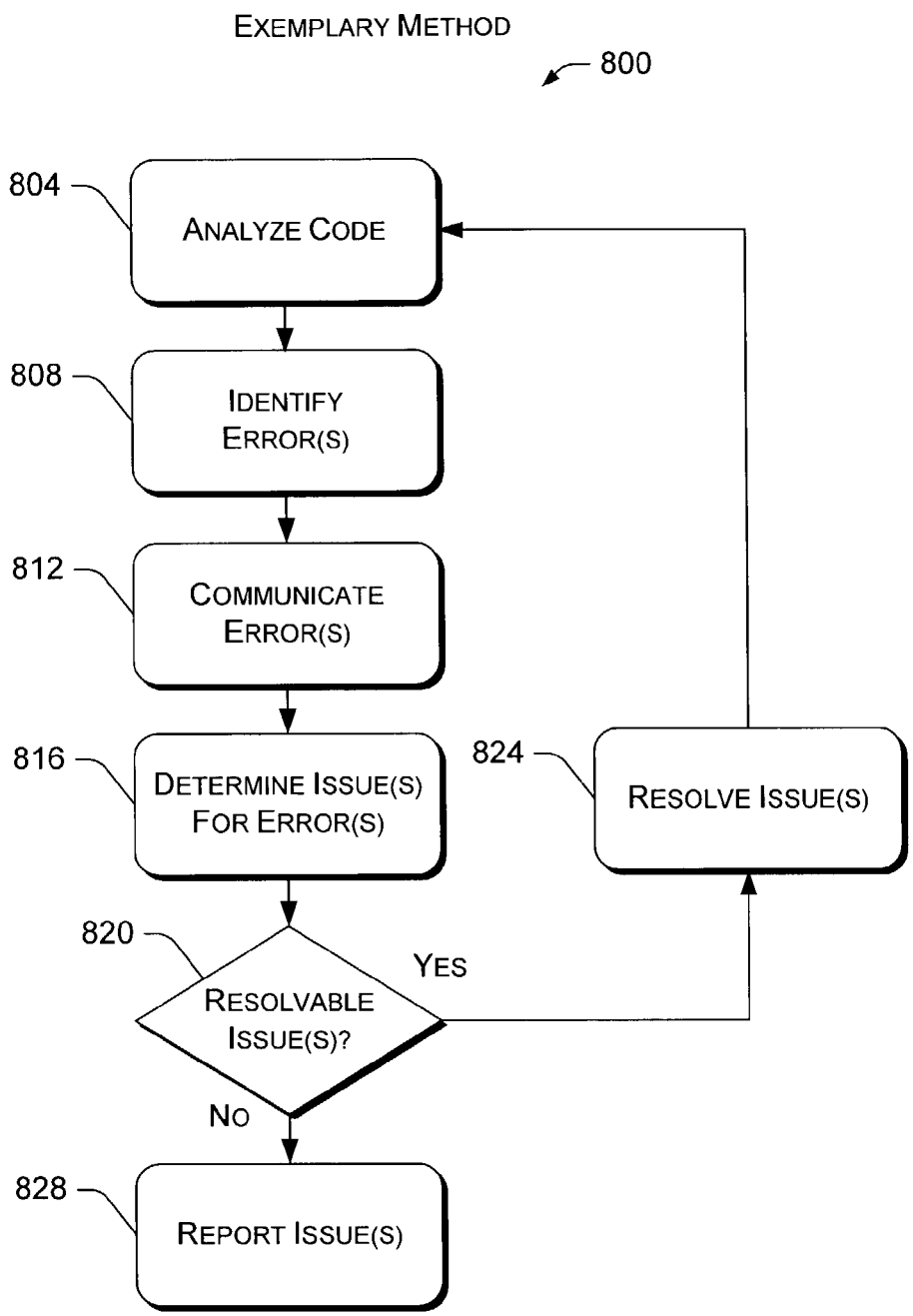
FIG. 8 is a block diagram of an exemplary method for reporting and/or resolving upgrade issues.

FIG. 8 shows another exemplary method 800 for reporting and/or resolving one or more issues. In an analysis block 804, a source analyzer analyzes code. An identification block 808 follows wherein the source analyzer identifies one or more errors based on the analysis. In a communication block 812, the one or more identified errors are communicated from the source analyzer to an upgrade analyzer. While a source analyzer and an upgrade analyzer may be part of an upgrade module, a source analyzer may also be a separate application or device (e.g., a compiler, etc.). In the former case, communication may involve simply passing an argument from one module element to another while in the latter case communication may involve line or wireless transmission. In either case, an upgrade analyzer receives identified information from a source analyzer thereby allowing the upgrade analyzer, per determination block 816, to determine whether one or more issues are associated with a communicated error. A decision block 820 follows that decides whether the determined one or more issues are resolvable. For example, the upgrade analyzer or associated upgrade wizard may decide whether an issue is resolvable. If the issue is resolvable, then a resolution block 824 resolves the issue and the method 800 continues at the analysis block 804. If the issue is not resolvable, then a report block 828 reports the issue and the method 800 optionally continues at the analysis block 804. If the reported issue is fatal (e.g., highly certain and fatal or fatal, etc.), then the method 800 optionally terminates. Of course, if the issue only pertains to a minor function of the code, then the method 800 may continue, for example, based on a user instruction. Of course, the method 800 may also continue, for example, based on a user instruction responsive to a certainty of occurrence (e.g., known certainty, estimated certainty, etc.). The method 800 may further optionally display or otherwise inform a user of a certainty associated with an issue wherein the certainty is optionally determined from a database (e.g., an issue database), information from a source analyzer, a compiler, etc.

Figure 9:
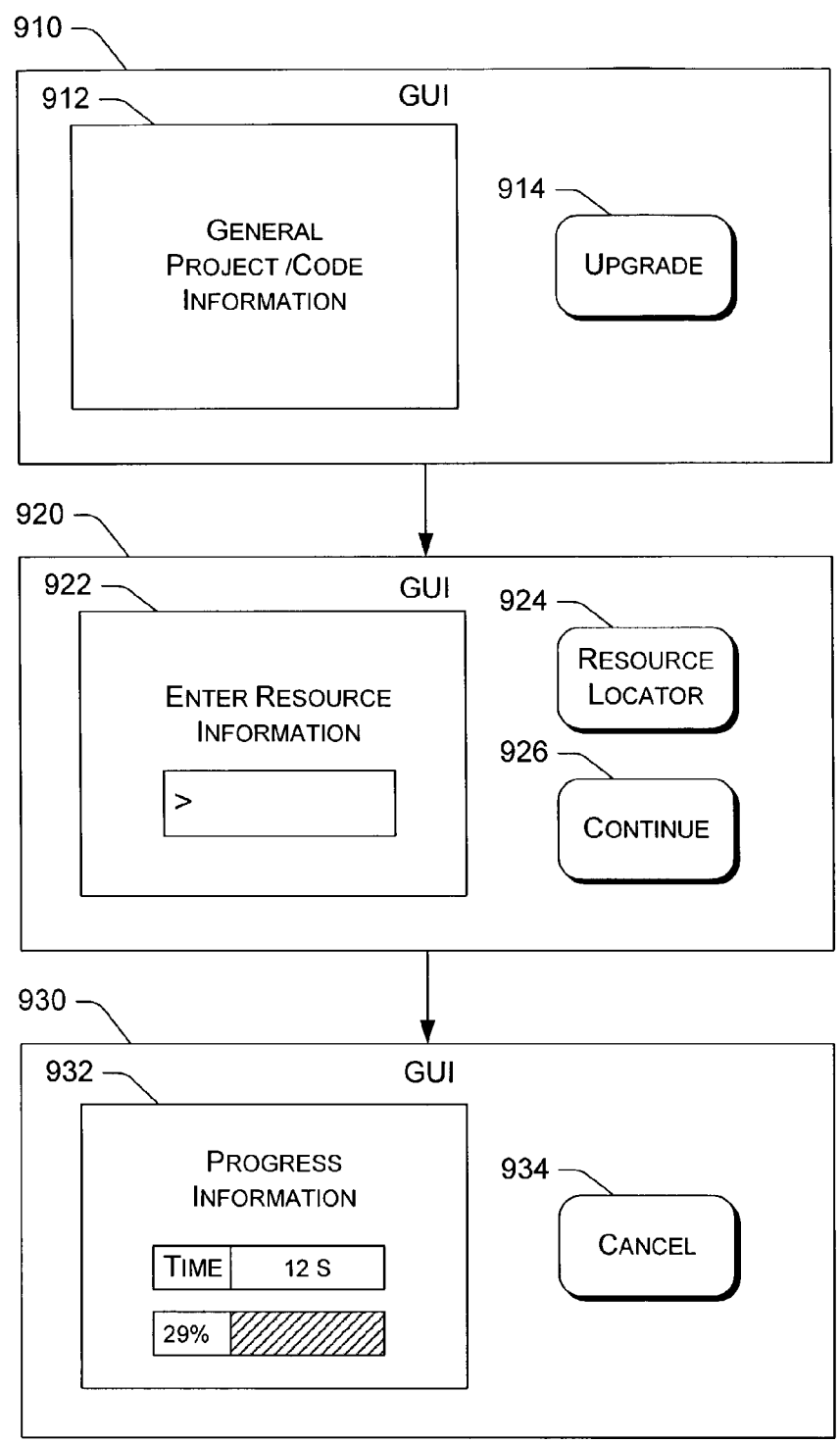
FIG. 9 is a block diagram illustrating exemplary GUIs associated, for example, with an upgrade wizard.

FIG. 9 shows a series of exemplary graphical user interfaces (GUIs) 910, 920, 930 associated with an upgrade module. For example, the GUIs 910, 920, 930 may be part of an upgrade wizard. The GUI 910 includes a general information window 912 for displaying general project and/or code information. The GUI 910 also includes an upgrade button 1014, for example, to allow a user to initiate an upgrade or migration of the displayed project and/or code. Upon selection of such a button, the GUI may display information pertaining to upgrade or migration resources. The exemplary GUI 920 includes such information, for example, an entry window 922 for entering resource information and a resource locator button 924 to aid in locating resources. The resource locator button 924 may allow a user to browse files locally and/or remotely to locate resources, in addition, the resource locator button 924 may initiate a local and/or remote resource search. An exemplary upgrade wizard may learn resource locations during an upgrade and then use the learned locations in subsequent upgrades, for example, once a user selects the resource locater button 924. Of course, resource locating may occur automatically (e.g., as a user selectable option, etc.), for example, an upgrade analyzer, an upgrade module, and/or an upgrade wizard may optionally locate resources automatically. The GUI 920 also includes a continue button 926, which allows a user to continue the upgrade or migration process. As upgrade or migration progresses, a GUI may display information related to the upgrade or migration process. For example, the GUI 930 includes a progress information window 932 that shows a time progression and a percentage progression. The time progression display may indicate elapsed time and/or time or estimated time to completion of an upgrade or migration process. The percentage progression display may indicate percent progress and/or a final or estimated final percent of upgrade or migration. A user may optionally return to the GUI 930, for example, as more resources are added and/or modifications are made. The GUI 930 also includes a cancel button 934 that allows a user to cancel the upgrade or migration process.

Figure 10:
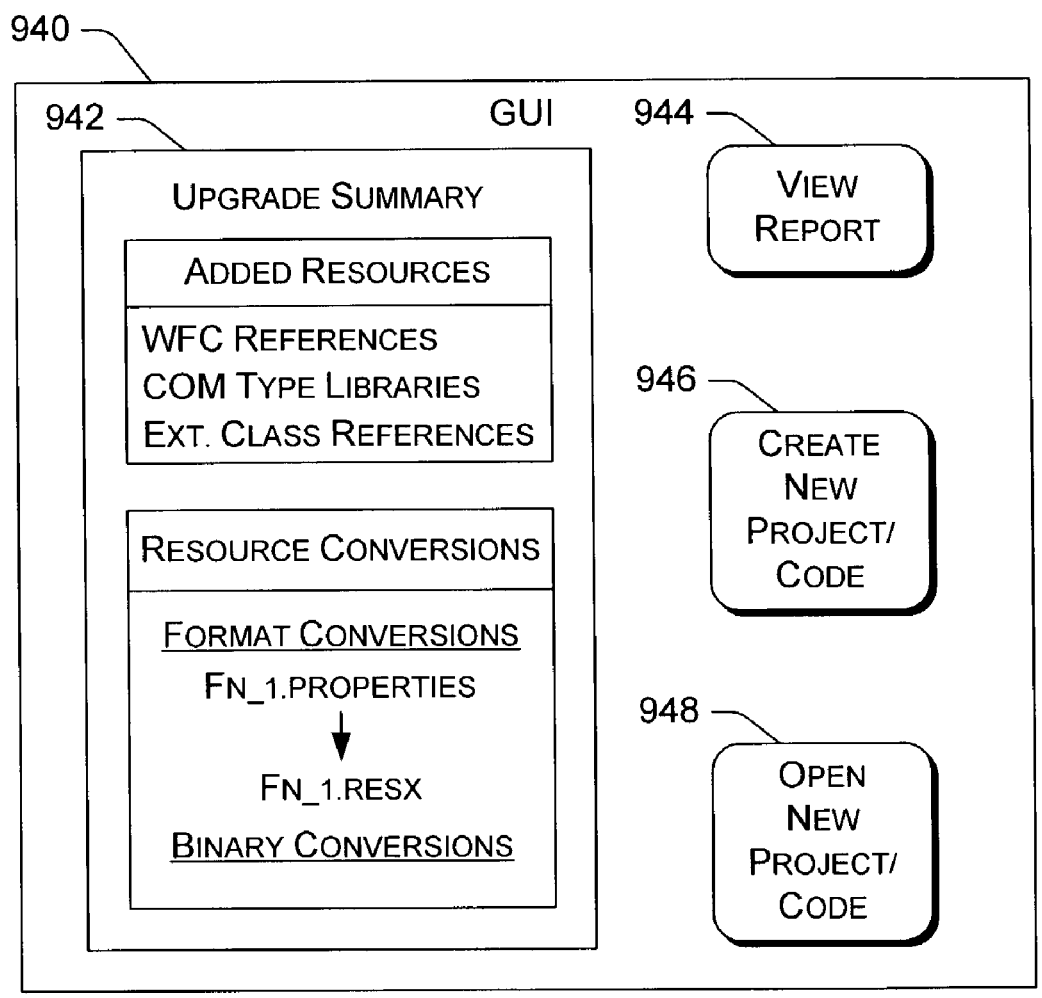
FIG. 10 is a block diagram illustrating an exemplary GUI associated, for example, with an upgrade wizard.

FIG. 10 shows another exemplary GUI 940 that includes an upgrade summary window 942, a view report button 944, a create new project/code button 946 and an open new project/code button 948. The upgrade summary window 942 includes, for example, information pertaining to added resources and resource conversions. Added resources may include WFC references, COM type libraries, external class references, etc. Resource conversions may include format conversions (e.g., from ".properties" files to ".resx" files), binary conversions, etc. Binary conversions may occur through use of a binary conversion tool (e.g., jbimp.exe, which is available with the VJ# .NET™ IDE). The view report button 944 may allow a user to view a report containing information related to the upgrade or migration; the create button 946 may allow a user to create a new project and/or code upon completion of the upgrade or migration process; and the open button 948 may allow a user to open a new project and/or code.

Exemplary Implementation

Various exemplary code segments follow that pertain to upgrade or migration.

Exemplary Code Segment 1

Exemplary code segment 1 includes code for an UpgradeAnalyzer class. This code includes a method for invoking an upgrade analyzer from an upgrade wizard, a callback interface that allows the upgrade analyzer to callback to the upgrade wizard, a progress information method, an analysis completion method, and a reporting method.

```
/// <summary>
/// This is the abstract class
/// </summary>
internal class UpgradeAnalyzer
```

{
/*
* Main method for invoking an upgrade analyzer from an upgrade wizard
* (e.g., one call per project to be upgraded or migrated).
*/
public IUpgradeInfo AnalyzeProject( -continued

```
    string [] compilerOptions,
    string classpath,
    IUpgradeWizardCallback wizardCallback);
}
```

```
/*
 * Interface on which the upgrade analyzer will callback for
 * every asynchronous communication to the upgrade wizard.
 */
internal interface IUpgradeWizardCallback
{
/*
 * This code may be used to supply progress information
 * (e.g., broken up into sets of tasks like "analyzing COM references",
 * "analyzing external references", etc.)
 * Returns Boolean value to indicate if processing should continue
 */
    bool ReportProgress(string taskSet, int tasksDone, int totalTasks);
/*
 * To inform the upgrade wizard that the upgrade analysis is finished
 * wherein "bSuccess" being false indicates that the upgrade analysis
 * encountered some unexpected errors
 */
    void ReportUpgradeComplete(bool bSuccess);
/*
 * This code may be used to callback to report a number of
 * issues (see, e.g., below "nIssues") encountered and a number of
 * files affected.
 * (e.g., may be used during upgrade progress display)
 */
    void ReportOccurrence(int nIssues, int nFiles);
}
```

Exemplary Code Segment 2

Exemplary code segment 2 includes code for an interface that may return upgrade information. Such code may be used by an upgrade wizard to get information from an upgrade analyzer that pertains to an upgrade or migration of a project and/or code. In code segment 2, all enumerations returned by "IUpgradeInfo" are non-null and empty enumerators will be returned if there is nothing to report for any particular issue. Code segment 2 also refers to "data1" and "data2", wherein data1 and data2 may be specified as follows according to the exemplary cases 1–3:

Exemplary Case 1: Where an issue is a compatibility error (e.g., java.lang.Class.forName, @com.register, etc.), then
    data1=compatibility error key (java.lang.Class.forName)
    data2=null Exemplary Case 2: Where an issue is a type reference error, then
    data1=type name as referred in source code.
    data2=classpath component if found in the class path and null otherwise. Note that an issueID may be used to determine if this data is valid.

Exemplary Case 3: Where an issue is a CLSID used in source code, then
    data1=filename where the type library (tlb) is located if found, else the CLSID itself. Note that an issueID may be used to determine what the data represents.
    data2=classname where the CLSID is to be attached.

```
/*
 * Interface to return upgrade information.
 * (e.g., upgrade wizard may use this to get results
 * of an upgrade analysis performed by an upgrade analyzer).
 */
internal interface IUpgradeInfo
{
/*
 * Returns an enumeration of typelibs and dlls where
 * the COM class information may be found.
 Returns an Enumerator for COM Type Libraries.
 */
    IEnumerator EnumCOMReferences( );
    Returns an enumeration of classpath components (e.g., where
 * 3rd party library class files are located).
    Returns an enumerator for Classpath References
 */
    IEnumerator EnumClasspathReferences( );
/*
 * Determines whether a project and/or code is using WFC
 * Returns additional references to compile the project and/or code
 */
    IEnumerator EnumAdditionalReferences( );
/*
 * Returns entire data pertaining to the upgrade in a "DetailsInfo" structure.
 */
    IEnumerator EnumUpgradeDetailInfo( );
}
class DetailsInfo{
    public readonly int uniqueID;
    public readonly int issueID;
    public readonly string file;
    public readonly int startLine;
    public readonly int startCol;
    public readonly int endLine;
    public readonly int endCol;
/*
 * The next two exemplary fields contain extra data that may
 * make the issue more meaningful
 */
    public readonly string data1;
    public readonly string data2;
}
```

Exemplary Code Segment 3

Exemplary code segment 3 includes an interface for an upgrade analyzer and a source analyzer, for example, a source analyzer or a compiler operating in special mode as a source analyzer. The interface allows for communication of upgrade or migration messages, progress information, etc.

```
/*
 * An interface to communicate information to an upgrade analyzer
 *(e.g., a .NET™ interface exposed to a COM interop layer).
 */
[ComImport]
[Guid("abc-def2")]
```

```
[InterfaceType(ComInterfaceType.InterfaceIsUnknown)]
internal interface IAnalyzerCallback
{
/*
 * Communicate or report progress to the upgrade analyzer
 * "currentTask" is the current stage of compilation
 * "tasksDone" is the number of files compiled
 * "totalTasks" is the total number of files
 */
void UpgradeAnalyzerReportProgress(
[In][MarshalAs(UnmanagedType.LPWStr)]
string currentTask,
[In]
int tasksDone,
[In]
int totalTasks
);
/*
 * The upgrade analyzer determines what kind of issue a particular type ref
 * error may be related to.
 * "typeRef" is the type name in the source code (e.g., could be simple or
 * qualified)
 */
void TypeRefError(
[In][MarshalAs(UnmanagedType.LPWStr)]
string typeRef,
[In][MarshalAs(UnmanagedType.LPWStr)]
string file,
[In]
int startLine,
[In]
int startCol,
[In]
int endLine,
[In]
int endCol
);
/*
 * At the beginning of a semantic analysis of a file, imports used may be
 * defined by a file used to resolve the type ref errors.
 * "imports" is an array of strings for the imports.
 */
void DefineImports(
[In][MarshalAs(UnmanagedType.LPWStr)]
string file,
int numberImports,
[In][MarshalAs(UnmanagedType.LPArray,
ArraySubType=UnmanagedType.LPWStr, SizeParamIndex=1)]
string[ ] imports
);
/*
 * This is a generic exemplary method called for compatibility issues
 * identified. The upgrade analyzer may lookup any particular issue in a
 * table using a table key.
 * At this point, no other processing may be required.
 */
void CompatError(
[In][MarshalAs(UnmanagedType.LPWStr)]
string key,
[In][MarshalAs(UnmanagedType.LPWStr)]
string file,
[In]
int startLine,
[In]
int startCol,
[In]
int endLine,
[In]
int endCol
);
/*
 * This code will help inform the upgrade analyzer that at least some
 * shipped dlls are being used which are not part of a standard reference list.
 * Exemplary current dlls may include vjswfc.dll and vjswfccw.dll
 */
void UsingAssembly(
[In][MarshalAs(UnmanagedType.LPWStr)]
string assemblyPath
);
/*
 * Returns clsids and the source code class where they were found.
 */
void CLSIDError(
[In][MarshalAs(UnmanagedType.LPWStr)]
string clsid,
[In]
bool isInterface,
[In][MarshalAs(UnmanagedType.LPWStr)]
string className,
[In][MarshalAs(UnmanagedType.LPWStr)]
string file,
[In]
int startLine,
[In]
int startCol,
[In]
int endLine,
[In]
int endCol
);
}
```

As suggested in a comment of in the exemplary code segment 3 ("a .NET™ interface exposed to a COM interop layer"), the .NET™ framework can effectively use COM and, if a reference to COM is added, .NET™ allows for creation of a COM Interop layer. Thus, it is possible, for example, to expose .NET™ classes as a COM component (e.g., may involve building type libraries and registering classes). COM can separate the definition of what a component can do and expose this functionality as an interface. The COM Interop layer can provide access between managed code (e.g., .NET™ framework code) and unmanaged code (e.g., COM.). The COM Interop layer allows for two-way access, so a COM client may also access a .NET™ component.

Exemplary Code Segment 4

Exemplary code segment 4 includes an interface for source analyzer communications, for example, with an upgrade analyzer or other component. In this particular example, a compiler may serve as a source analyzer.

```
/*
 * A COM interface for source analyzer communication
 */
[ComImport]
[Guid("acf-gik3")]
[InterfaceType(ComInterfaceType.InterfaceIsDual)]
internal interface IJCCallerForUpgrade
{
/*
 * An entry point for a compiler main
 * "argc"—number of arguments
 * "args"—string arguments
 * "analyzerCallback"—The callback interface
 */
[DispId(1)]
void JCMainForUpgrade(
[In]int argc,
[In][MarshalAs(UnmanagedType.LPArray,
ArraySubType=UnmanagedType.LPWStr,SizeParamIndex=0)]
    string [ ] args,
[In][MarshalAs(UnmanagedType.Interface)]
IAnalyzerCallback analyzerCallback
);
}
```

The exemplary code segments 1, 2, 3 and 4 are optionally used to perform aforementioned exemplary methods for upgrade and/or migration. For example, exemplary code may implement a method of communicating between an upgrade analyzer and a source analyzer that includes issuing, by the upgrade analyzer, a call having one or more call parameters; receiving, by the source analyzer, the call and parsing the call to retrieve the one or more parameters; and issuing, by the source analyzer, an acknowledgment having one or more acknowledgment parameters related to information identified by the source analyzer via an analysis of a source code. The one or more acknowledgement parameters optionally include one or more task parameters (e.g., a current task parameter, a tasks completed parameter, a total number of tasks parameter, etc.). Another exemplary code may implement a method of communicating between an upgrade wizard and an upgrade analyzer that includes issuing, by the upgrade wizard, a call having one or more call parameters; receiving, by the upgrade analyzer, the call and parsing the call to retrieve the one or more parameters; and issuing, by the upgrade analyzer, an acknowledgment having one or more acknowledgment parameters related to issues determined by the upgrade analyzer at least in part via an analysis of a source code. The one or more acknowledgement parameters optionally include one or more error parameters (e.g., compatibility error parameters, type reference error parameters, a class ID error parameters, etc.). Of course, the exemplary code may include one or more call parameters for invoking an upgrade analyzer.

Various code segments (e.g., segments 1, 2, 3 and/or 4) are further optionally used to implement an upgrade module or component thereof to upgrade or migrate a project or code written in a language associated with the VJ++™ IDE (e.g., the JAVA™ language (Sun Microsystems, Inc., Sunnyvale Calif.)) and targeting an associated runtime engine (e.g., a JVM, etc.) to the VISUAL STUDIO™ IDE (Microsoft Corp., Redmond, Wash.) targeting the .NET™ runtime engine. For example, as described below, source code written in a language associated with the VJ++™ IDE is migrated to a .NET™ IDE having VISIUAL J#™ (VJ#) capabilities and subsequently compiled to an intermediate language that targets the .NET™ RE. Such an exemplary migration or upgrade optionally preserves the selected source code, including syntax and API calls.

In essence, the VJ# .NET™ IDE can provide VJ++ IDE users with a migration path to .NET™ capabilities via various exemplary methods and/or upgrade components. The VJ# .NET™ IDE also allows a user to implement applications written in the JAVA™ language using certain APIs from the JAVA™ Development Kit (JDK), which are included in VJ# class libraries, or APIs from the .NET™ capabilities.

In addition, the .NET™ IDE also provides VJ++ IDE users with extensions useful for migration, such as, JAVA™ COM and J/Direct. After upgrade or migration, a user may use .NET™ APIs to perform tasks such as, but not limited to, those performed by JAVA™ remote method invocation (RMI) and native interface (JNI). With respect to conversions, the VJ# .NET™ IDE includes a conversion tool to upgrade compiled JAVA™ byte code to intermediate language code, which is useful for upgrading libraries to a form that they can be used from .NET™ applications.

An exemplary method of upgrading or migrating a VJ++ IDE project or code involves invoking a VJ# .NET™ upgrade wizard by opening a VJ++ project with, for example, VISUAL STUDIO™ .NET™ having appropriate upgrade components. In this example, upon upgrade or migration, the VJ++ source code remains as a VJ++ language code (e.g., as a JAVA™ language code). In addition, calls to various resources, such as, JDK APIs may be preserved. Thus, source code is preserved, including syntax and API calls.

According to this exemplary method, components written in different .NET™-compliant languages (e.g., VISUAL BASIC®, VISUAL C#®, VISUAL C++®, etc.) may interoperate with each other in a project or a code, which makes partial or mixed upgrades or migrations possible. For example, in a partial or mixed migration, a user may upgrade or migrate one component of an application to a VJ# .NET™ component, and convert another component to a C# component. In such a partial or mixed migration, a user may choose to migrate one project component to VJ# .NET™ and access it from a component converted to C#.

In such an exemplary method or system, source control settings from the VJ++ project solution may not explicitly upgraded to a VJ# solution file; therefore, a user may choose to add a new VJ# solution file and project file (e.g., sln and .vjsproj) to a source control, for example, via a change source control command on a source control menu that can rebind projects to respective server locations, etc. Such a source control menu is optionally available as a feature of an upgrade analyzer or an upgrade wizard.

In some instances, a VJ++ project or code may access one or more classes defined in another project or code. If such a project is opened in the VJ# .NET™ IDE, prior to compilation to an intermediate language, a user (or alternatively, an upgrade wizard or analyzer) may add a project reference. For example, a user may open the VJ++ solution in VJ# and, when prompted, upgrade each project in the solution. If necessary, the user may add a reference to dlls such as the vjswfc.dll and vjswfchtml.dll. A user may also choose to ensure that output type property of the project whose class is being referenced is a class library project.

In this exemplary method, in a VJ++ solution that contains multiple projects, if one or more projects are not upgraded or migrated, remaining projects may be marked as non-buildable or with some other suitable marking. In such a method, the next time a user opens an upgraded or migrated solution, an upgrade wizard or other component may prompt the user to upgrade remaining projects.

In general, a VJ++ solution containing multiple projects and one or more circular dependencies may present obstacles during upgrade or migration to VJ#. For example, if a VJ++ solution contains projects A and B, A can use classes in B and B can use classes in A if class paths are properly set (e.g., wherein merge all project-specific classpaths in a solution property is set). In the VJ# IDE, such a solution would be upgraded or migrated so that project A adds a reference to project B and project B adds a reference to project A, so long as both projects were class library projects. However, circular references are not allowed in the VJ# IDE; thus, a user may need to combine both projects into a single assembly in the VJ# IDE.

Figure 11:
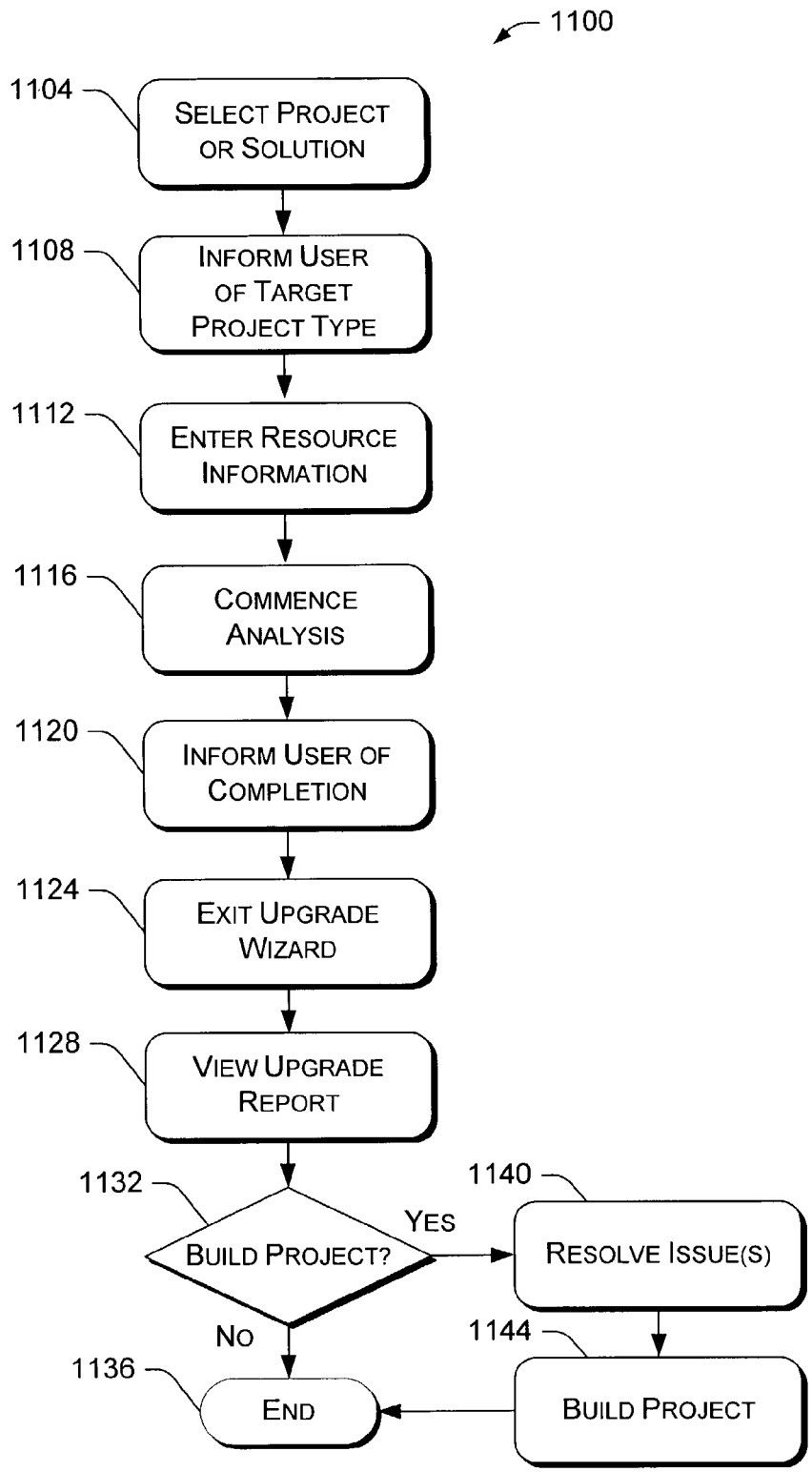
FIG. 11 is a block diagram of an exemplary method for building an upgraded or migrated project.

FIG. 11 shows an exemplary method 1100 for upgrading or migrating a VJ++ project or solution to a VJ# project. In a selection block 1104, a user selects a VJ++ project (.vjp) or solution (.sln) file (e.g., the native project or solution) to open using a VJ# IDE (e.g., the foreign IDE). The VJ# IDE detects the VJ++ project as native to another IDE and automatically initiates an upgrade wizard. The upgrade wizard presents an initial window containing information about the VJ++ project being upgraded or migrated. If the user wishes to upgrade or migrate the displayed VJ++ project, the user selects a "next" control button and the upgrade wizard proceeds. The method 1100 then continues in an information block 1108 that uses the VJ++ project information and/or other information to inform the user of one or more possible target project types. The user can select or change target project type by, for example, selecting another VJ# project type from a list.

Once a user has selected a target project type, in an entry block 1112, the upgrade wizard prompts the user to enter information about resources, such as, but not limited to, additional libraries (managed libraries as well as COM libraries) used by the project. If the user enters this information, it will be used in analyzing the project sources; otherwise, the upgrade analyzer may make best efforts to locate additional classes used in the project. After entry of pertinent resource or other information, if required, the method 1100 continues in a commencement block 1116, wherein an upgrade analyzer commences analysis. The analysis may take anywhere from approximately a few seconds to perhaps many minutes depending on the size of the project (e.g., the time may be similar to a project compile time). During this analysis, the upgrade wizard may remain active and allow a user to visualize information germane to the analysis. For example, the upgrade wizard may present a progress bar (e.g., time, percent, etc.) that shows progress related to upgrade or migration. During this time the user may optionally cancel the upgrade or migration using, for example, a cancel button.

Once the upgrade analyzer has completed its analysis of the project, then in an information block 1120, the upgrade wizard may present information that 11 indicates that the upgrade analysis is complete. While, as described below, the user can choose to see an upgrade report upon exiting the upgrade wizard, the following actions may occur before exiting the upgrade wizard:

a. A new VJ# project is optionally created as per the information shown/chosen by the user in a prior step.

b. An upgrade report is optionally created and added to the upgraded or migrated project. This report typically lists all issues identified by the upgrade analyzer during the upgrade analysis.

c. If the project used WFC, needed references may be automatically added to the project.

d. If the project used COM libraries, then type libraries for the associated COM servers are imported to managed assemblies and these are added to the project references.

e. If the project contains files in known resource formats such as ".properties", these files may be automatically converted to new resource formats (e.g., ".resx") and added to the upgraded or migrated project.

f. If the project has references to external classes, these are optionally probed for in the CLASSPATH of the original project by the upgrade analyzer, and folder locations containing missing classes are identified and added to the upgrade report. In addition, a user may subsequently use such information to perform a binary conversion of one or more external libraries and add the resultant library or libraries to the upgraded project references.

g. If the project uses unsupported classes or classes with known compatibility issues, these may be added to the report.

h. If multiple entry points exist for the project, the upgrade wizard optionally finds the startup object from the original project information and uses this to set the startup object for the upgraded project.

After the various aforementioned tasks occur, if required or desired, then in an exit block 1124, the upgrade wizard exits. If the user so chooses, an upgrade report is opened and displayed prior to exiting. Such an upgrade report may also be optionally opened using an IDE viewer or other viewer that is independent of the upgrade wizard. In general, upon exiting the upgrade wizard, the new upgraded or migrated project is open in the VJ# IDE. Before continuing, a user may, in a viewing block 1128, choose to view the upgrade report. The upgrade report may contain a plethora of information related to upgrade or migration. For example, the upgrade report may contain:

a. Basic information about the project that was upgraded, such as name, location, time of upgrade etc., and the number of issues identified by the analysis.

b. Upgrade issues identified by the analysis, grouped by category wherein each category can be expanded to show the issues for each category. A summary view is optionally displayed by default that includes number of issues in each category, and files affected, which may help identify a level of effort required to complete the upgrade or migration.

c. For each issue, a clickable link may exist, which takes the user to a help topic for the issue wherein each topic contains a brief description of the issue, and/or prescriptive guidance for the upgrade or migration path for that issue.

d. A number of occurrences of each issue, along with possible impact of each issue. Note that some issues may block compilation of the upgraded or migrated project until they are corrected, while some may be just warnings. The report may indicate whether an issue is of the former or latter category.

e. Additional information about the upgraded project, such as COM libraries added to the references list, and resource files converted and added to the project.

f. If the issue is that of a missing class reference, the issue report may also indicate any location in the CLASSPATH that has been identified by the analysis as containing the missing class. A user may use this information to do a binary conversion of the classes to an intermediate language (e.g., MSIL) format and add the converted library to the upgraded project's reference list.

After review of the upgrade report, whether by a manual or an automatic review, a decision is made, in a decision block 1132, as to whether to build a new project. If a decision is made to not build a new project, then the method 1100 terminates in an end block 1132. However, if a decision is made to build a new project, then the method 1100 continues in a resolution block 1140, if required. For example, a user may attempt to build a new project, in which case a number of errors may be encountered corresponding to unresolved issues. In the resolution block 1140, a user may attempt to correct each issue following guidance given in by a prescriptive help feature. Following issue resolution, a user may, in a build block 1144, build the new project. Of course, the building process may result in additional information related to issues or issue resolution. Thus, the build process may occur in an iterative or a non-iterative manner. Upon success of the build, the method 1100 terminates in the end block 1136.

While the exemplary method 1100 is presented for a single project, if a user wishes to upgrade or migrate a solution with multiple projects, then various blocks are optionally repeated for each of the projects in the solution.

Exemplary methods, devices and/or systems presented herein optionally include an upgrade module or component thereof which can: give a high level summary of an effort estimate that indicates the amount of effort for completion of upgrade or migration; identify external references and automatically convert such references (e.g., binary conversion) and add converted references to an upgraded project; present a task list populated any issue that may require or results in a possible source code change; insert comments in source code to indicate required changes and/or link to prescriptive guidance; and/or allow a user to change code while preserving the original code in commented form wherein the comments explain any particular change.

Exemplary methods, devices and/or systems presented herein optionally include an upgrade module or component thereof that accepts user supplied information about additional references and project CLASSPATH and that uses such information in an analysis; identifies whether WFC is used; identifies whether COM references are used and, if so, identifies the CLSID of respective COM servers used; identifies occurrences of unresolved references to types, with file and line information that indicate where any particular occurrence occurred and, if so, probes in the CLASSPATH to locate any missing references; and/or identifies occurrences of references to packages or classes with compatibility issues or unsupported packages and classes, with file and line information. Such features are typically associated with a source analyzer or a compiler operating in a special mode and functioning as a source analyzer.

Exemplary methods, devices and/or systems presented herein optionally include an upgrade module or component thereof that collates multiple instances of unresolved references of the same type or types in a given package; filters such multiple instances to a single item for each type or package; collates multiple instances of references to COM servers; filters such multiple instances to a single item for each COM server; collates multiple instances of locations in CLASSPATH where an unresolved type is located; presents for such multiple instances a single item for each unique folder location; and/or reports information gathered by any source analysis. Such features are typically associated with an upgrade analyzer.

Exemplary methods, devices and/or systems presented herein optionally include an upgrade module or component thereof that presents a step-by-step interface to the user; processes user input; creates a new project of specified type; automatically set project parameters and settings for the upgraded project, based on the original project settings; adds references to WFC libraries, if required; if COM servers are used, imports type libraries to managed assemblies and adds these references; converts resource files to .NET™ format and adds the converted resources to an upgraded or migrated project; creates a report with project information and upgrade issues and adds hyperlinks to relevant help topic for each issue. Such features are typically associated with an upgrade wizard.

Exemplary methods, devices and/or systems presented herein optionally include an upgrade module or component thereof that annotates class libraries (e.g., via an attribute mechanism) to identify classes with compatibility issues and/or unsupported classes; navigates one or more topics using a keyword for each issue wherein the navigation function is used to implement a link from an upgrade report listing an issue to the corresponding help topic; and accesses help topics for issues.

While several specific exemplary methods presented herein refer to VJ++ projects and code and the VJ# IDE, upgrade and/or migration from the Windows API to .NET™ framework, from the JSP to ASP. NET™ and J2EE Vendor migration are within the scope of various disclosed exemplary methods, devices and/or systems and equivalents thereof.

Thus, although some exemplary methods and systems have been illustrated in the accompanying Drawings and described in the foregoing Detailed Description, it will be understood that the methods and systems are not limited to the exemplary embodiments disclosed, but are capable of numerous rearrangements, modifications and substitutions without departing from the spirit set forth and defined by the following claims.

What is claimed is:

1. A method implemented at least in part by a computing device, the method comprising:
   selecting at least a portion of source code written in a programming language having an associated native compiler and an associated native runtime engine; and
   executing an upgrade module, the upgrade module
   configured to determine issues related to compilation of the source code on a foreign compiler
   configured to insert comments in the source code that indicate required changes and that link to prescriptive guidance to help resolve one or more of the issues and
   configured to identify occurrences of references to packages and classes with compatibility issues and occurrences of unsupported packages and classes with file and line information to help resolve one or more of the issues.

2. The method of claim 1, wherein the selecting comprises selecting the source code using an upgrade wizard initiated in an integrated development environment.

3. The method of claim 1, further comprising resolving resolvable issues wherein the resolving optionally comprises adding references.

4. A computer-readable medium, having at least one physical media, storing computer-executable instructions to select at least a portion of source code written in a programming language having an associated native compiler and an associated native runtime engine; and to execute an upgrade module, the upgrade module configured to determine issues related to compilation of the source code on a foreign compiler, configured to insert comments in the source code that indicate required chances and that link to prescriptive guidance to help resolve one or more of the issues and configured to identify occurrences of references to packages and classes with compatibility issues and occurrences of unsupported packages and classes with file and line information to help resolve one or more of the issues.

5. A method implemented at least in part by a computing device, the method comprising:
selecting at least a portion of source code written in a programming language having an associated native compiler and an associated native runtime engine;
setting a foreign compiler to operate in a special mode configured to determine issues related to compilation of the source code on the foreign compiler, configured to insert comments in the source code that indicate required changes and that link to prescriptive guidance to help resolve one or more of the issues and configured to identify occurrences of references to packages and classes with compatibility issues and occurrences of unsupported packages and classes with file and line information to help resolve one or more of the issues.

6. The method of claim 5, wherein the setting comprises using an interface for communicating settings.

7. The method of claim 5, wherein the special mode to determine issues is configured to analyze information using one or more APIs.

8. The method of claim 5, wherein the special mode to determine issues is configured to identify information related to one or more missing class references.

9. The method of claim 8, wherein the special mode to determine issues is configured to use an API to locate a class based at least in part on the information related to one or more missing class references.

10. The method of claim 5, wherein the special mode to determine issues is configured to search to detect type libraries for one or more COM interfaces.

11. The method of claim 10, wherein the search comprises a registry search.

12. The method of claim 5, wherein the special mode is configured to identify information related to API calls.

13. A computer-readable medium, having at least one physical media, storing computer-executable instructions to select at least a portion of source code written in a programming language having an associated native compiler and an associated native runtime engine; to set a foreign compiler to operate in a special mode configured to determine issues related to compilation of the source code on the foreign compiler, configured to insert comments in the source code that indicate required changes and that link to prescriptive guidance to help resolve one or more of the issues and configured to identify occurrences of references to packages and classes with compatibility issues and occurrences of unsupported packages and classes with file and line information to help resolve one or more of the issues.

14. A compiler implemented at least in part by a computing device, the compiler configured to identify information related to compilation of a foreign source code, written in a programming language, to an intermediate language code, configured to determine issues related to compilation of the foreign source code on the compiler, configured to insert comments in the foreign source code that indicate required changes and that link to prescriptive guidance to help resolve one or more of the issues and configured to identify occurrences of references to packages and classes with compatibility issues and occurrences of unsupported packages and classes with file and line information to help resolve one or more of the issues.

15. An upgrade module implemented at least in part by a computing device, the upgrade module comprising:
an upgrade wizard component;
an upgrade analyzer component; and
a source analyzer component wherein the upgrade wizard component operates in conjunction with an IDE to facilitate migration of source code written in a programming language or an uncompiled project to the IDE or a runtime engine associated with the IDE;
wherein the upgrade module is configured to insert comments in the source code that indicate required changes and that link to prescriptive guidance and further configured to identify occurrences of references to packages and classes with compatibility issues and unsupported packages and classes with file and line information.

16. The upgrade module of claim 15, wherein the upgrade wizard component comprises a GUI for displaying an estimated effort required for the migration of the source code or the project, an estimated time to completion of the migration of the source code or the project, and/or a progress indicator to indicate progress toward complete migration of the source code or the project.

17. The upgrade module of claim 15, configured to identify external references, convert the external references, and add the converted references to the source code or the project.

18. The upgrade module of claim 15, configured to present a task list of one or more issues that may require and/or result in a change to the source code.

19. The upgrade module of claim 15, configured to accept user supplied information about additional references and/or class paths and to use the user supplied information in an analysis.

20. The upgrade module of claim 15, configured to identify use of WFC and/or COM references.

21. The upgrade module of claim 15, configured to identify CLSIDs associated with COM servers.

22. The upgrade module of claim 15, configured to identify occurrences of unresolved references to types and provide file and line information that indicate where any particular occurrence occurred.

23. The upgrade module of claim 15, configured to probe a class path to locate any missing references.

24. The upgrade module of claim 15, configured to collate multiple instances of unresolved references.

25. The upgrade module of claim 15, configured to filter multiple instances of an unresolved reference to a single item.

26. The upgrade module of claim 15, configured to collate multiple instances of references to COM servers.

27. The upgrade module of claim 15, configured to filter multiple instances of references to COM servers to a single item for each COM server.

28. The upgrade module of claim 15, configured to collate multiple instances of locations in CLASSPATH where an unresolved type is located.

29. The upgrade module of claim 15, configured to create an upgrade report with project or code information and upgrade issues and to add hyperlinks to a relevant help topic for each issue.

30. The upgrade module of claim 15, configured to annotate class libraries and to identify classes with compatibility issues and unsupported classes.

31. The upgrade module of claim 15, configured to navigate one or more help topics using a keyword wherein the navigation implements a link from an upgrade report listing an issue to a corresponding help topic.

32. A method, implemented at least in part by a computing device, to facilitate migration of source code to an integrated development environment or a runtime engine associated with the integrated development environment, the method comprising:

provviding source code written in a programming language;

analyzing the source code for issues;

deciding whether all of the issues are automatically resolvable to allow for migration of the source code to an integrated development environment or a runtime engine associated with the integrated development environment; and if all of the issues are not automatically resolvable, initiating a software module configured to insert comments in the source code that indicate required changes to the source code and that link to prescriptive guidance and configured to identify occurrences of references to packages and classes with compatibility issues and unsupported packages and classes with file and line information.

33. A method, implemented at least in part by a computing device, to facilitate migration of an uncompiled project to an integrated development environment or a runtime engine associated with the integrated development environment, the method comprising:

providing the uncompiled project;

analyzing the uncompiled project for issues;

deciding whether the issues are automatically resolvable to allow for migration of the uncompiled project to an integrated development environment or a runtime engine associated with the integrated development environment;

if all of the issues are not automatically resolvable, initiating a software module configured to insert comments in the uncompiled project that indicate required changes to the uncompiled project and that link to prescriptive guidance and configured to identify occurrences of references to packages and classes with compatibility issues and unsupported packages and classes with file and line information.

* * * * *